United States Patent

[11] 3,613,681

| [72] | Inventor | Joe R. Adams |
| | | P.O. Box 489, Cookeville, Tenn. 38501 |
| [21] | Appl. No. | 856,774 |
| [22] | Filed | Sept. 10, 1969 |
| [45] | Patented | Oct. 19, 1971 |

[54] THERAPEUTIC AID
7 Claims, 3 Drawing Figs.

[52] U.S. Cl. .................................................. 128/293, 128/156
[51] Int. Cl. ..................................................... A61f 7/00
[50] Field of Search ........................................ 128/156, 293

[56] References Cited
UNITED STATES PATENTS

| 2,811,154 | 10/1957 | Scholl ........................... | 128/156 |
| 3,033,201 | 5/1962 | Olsen ........................... | 128/156 |
| 3,074,405 | 1/1963 | Duensing ...................... | 128/293 |
| 3,092,110 | 6/1963 | Duensing ...................... | 128/293 |

*Primary Examiner*—Charles F. Rosenbaum
*Attorney*—Paul E. Hodges

ABSTRACT: A therapeutic aid comprising a closed cell, resilient, foamed elastomeric sheath dimensioned to be received in circumscribing relation about an afflicted body area, said elastomer being not more than about one-fourth inch thick and forming an effective thermal and moisture barrier between the afflicted body are and ambient atmosphere, and inner and outer isotonic surface coverings integrally bonded to and covering substantially the entire inner and outer surfaces of said elastomer sheath, said isotonic surface coverings being substantially equally tensioned with respect to each other and substantially tensioned with respect to said elastomer sheath.

PATENTED OCT 19 1971
3,613,681
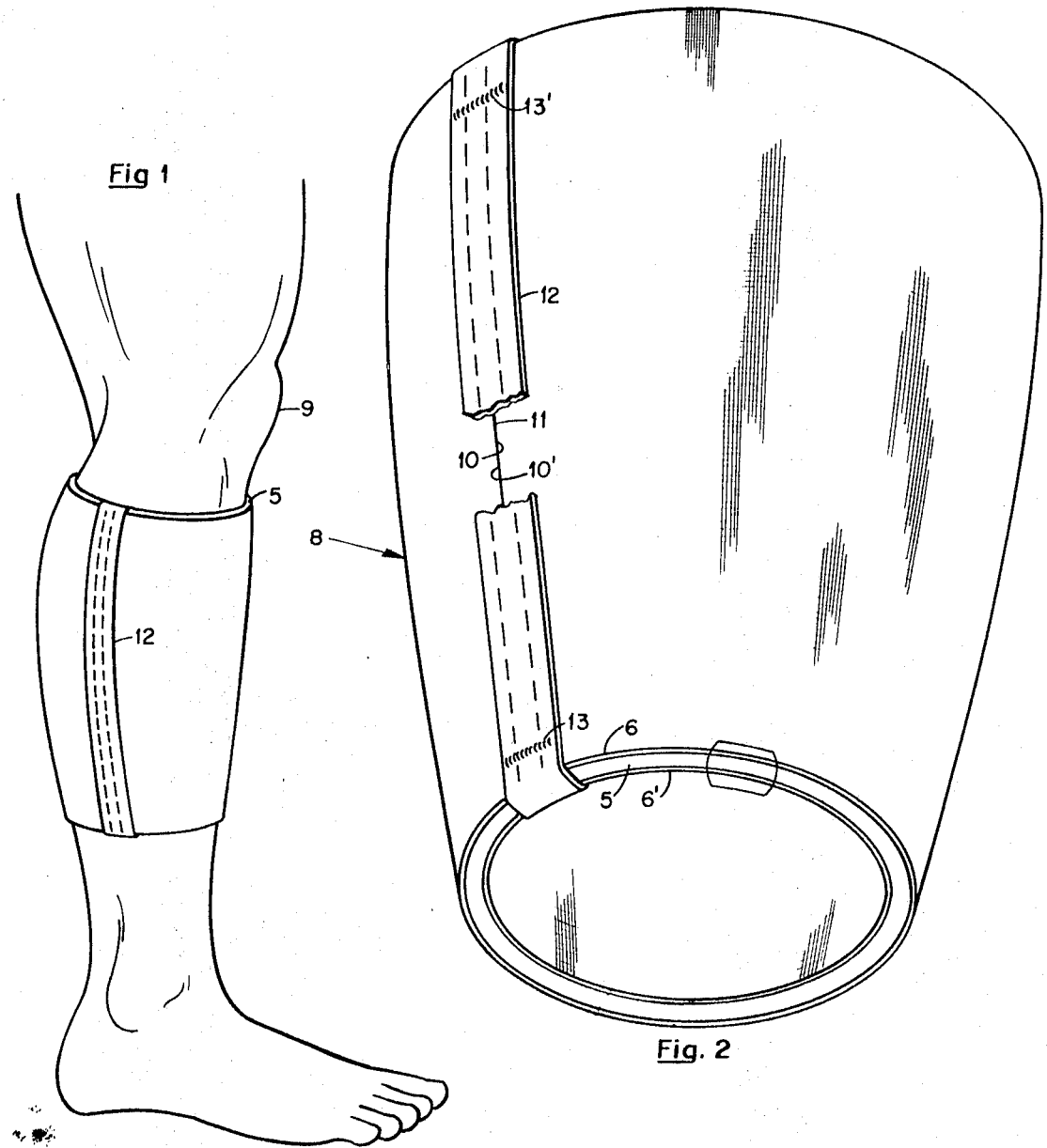
Fig 1
Fig. 2
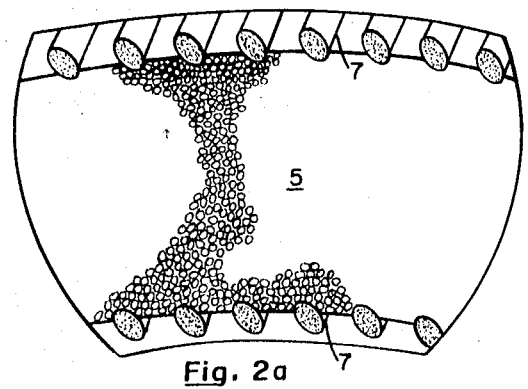
Fig. 2a
INVENTOR
JOE R. ADAMS
BY *Paul E. Hodges*
Atty.

THERAPEUTIC AID

This invention relates to therapeutic aids which serve to localize body heat and moisture within specific bounds to realize the therapeutic value thereof in obtaining relief from certain body afflictions. Specially, this invention relates to an elastomeric therapeutic aid having particular usefulness in the treatment of afflicted persons whose day-to-day routine of body movements tend to be exceptionally active in nature, for example professional and amateur atheletes.

Foam rubber sheaths have been suggested in the prior art as useful therapeutic devices which retain body heat and moisture at specified locations on the human body as well as providing muscular support. In general, these prior art sheaths have been unsatisfactory and have failed to become commercially acceptable. Among the shortcomings of these prior art sheaths is their short useful life. After only a few times of use, the foam rubber of the prior art sheaths loses it resiliency and thereby loses its capability to snugly fit the afflicted body area with resultant loss of its effectiveness. Foam rubber sheaths which must be stretched in passing them onto or removing them from a body member, such as a foot, are especially prone to rapidly lose their resiliency and effectiveness.

Additionally, foam rubber typically exhibits only a relatively slight rate of increase in modulus of elasticity as it is elongated. This is to say that the foam rubber provides essentially the same degree of muscular support when the sheath is only snugly fitted around a body portion as when the sheath is stretched considerably and placed around the body portion. The practical effect of this physical characteristic of foam rubber is that the foam rubber therapeutic sheaths of the prior art either fail to provide the desired muscular support if fitted only snugly or they restrict blood circulation if fitted sufficiently tight to provide muscular support.

It is therefore an object of this invention to provide an elastomeric therapeutic aid which functions to retain body heat and moisture in proximity to an afflicted body area when the aid is disposed in circumscribing relation about the afflicted area and which functions additionally as an effective muscle support when fitted only snugly about the afflicted body area. It is also an object to provide a sturdy elastomeric therapeutic aid which is machine washable and reusable, hence economically superior. It is a further object to provide an elastomeric therapeutic aid which is especially useful in treating afflicted body areas of persons who engage in active body movements during the period of treatment.

Other objects and advantages of the invention will become known by reference to the following description and the accompanying drawings. In the drawings:

FIG. 1 is an illustration of one embodiment of the invention as dimensioned to fit around the calf portion of the leg of a human body and showing the invention in place on the leg, only a portion of which is shown, FIG. 2 is a view of the elastomeric therapeutic aid of this invention and showing the isotonic inner and outer layers sandwiching the central foamed member, and FIG. 2A is an enlarged view of the circled portion of FIG. 2.

Generally, the therapeutic aid of the present invention comprises a closed cell, resilient, foamed, elastomer sheath dimensioned to be received in circumscribing relation about an afflicted body area, said elastomer member being less than about one-quarter inch thick and forming an effective thermal and moisture barrier between the afflicted body area and ambient atmosphere, and inner and outer isotonic surface coverings integrally bonded to and covering substantially the entire inner and outer surfaces of said elastomer member said isotonic surface coverings being substantially equally tensioned with respect to each other and substantially tensioned with respect to said elastomer sheath.

In accordance with the present invention, it has been found that full realization of the therapeutic effects of body heat and moisture in the treatment of afflictions such as muscular strain or overexertion, arthritis, etc., can be achieved by a therapeutic aid which also gives support to the muscles in and around the afflicted area. It has been discovered that this desired result can be best accomplished by a combination of members performing individual functions and additionally functioning in cooperative combination as will appear more fully hereinafter.

Specifically, it has been found that a closed cell, elastomer foam member dimensioned to snugly engage an afflicted body area and capable of functioning as an effective heat and moisture barrier can be faced on its inner and outer surfaces with isotonic members integrally bonded in tensioned states to the central elastomer foam member and thus produce a therapeutic aid capable of supplying extraordinary support to the muscles in the afflicted area such support being provided momentarily only as needed. It is of importance in the present invention that both the inner and outer isotonic members be bonded or formed integrally with the elastomer member for it is in this manner of combination that it has been discovered that the modulus of elasticity of the product exhibits precipitous increase upon relatively slight elongations of the product. This is to say that when the product of the present invention is fitted only snugly about the afflicted body area, the calf of a human leg for example, and not adversely reducing blood circulation in the afflicted area, only slight elongation of the product as by flexing of the leg muscles, brings about an inordinately large and rapid decrease in the tendency of the product to expand further. Thus the small stretch effected by muscle flexing increases to a very large degree the support given to the muscle.

In the preferred embodiment of the present invention, a foamed Neoprene elastomer is preferred as the foam member. One acceptable method for producing the foam member comprises expanding the elastomer by use of a "blowing agent" of the kind well known in the art which decomposes at a predetermined temperature to release nitrogen gas. The gas thus released forms noninterconnecting cells in the product. The cells retain the nitrogen gas indefinitely creating, in effect, a gas-filled cushion. This foamed product is impervious to air and possesses low thermal conductivity, displaying a $k$ factor of about 0.5 (ASTM spec. C–177). The product is resilient, possessing a maximum elongation in excess of 400 percent. Its modulus of elasticity at 100, 300 and 400 percent elongation is 7.9, 23.8, 31.7 and 55.6, respectively.

The elastomer foam is normally produced in a flat sheet. A thickness of between about one-sixteenth to one-quarter inch is satisfactory for purposes of the present invention, with one-eighth-inch thickness being preferred, especially as respects the tendency of the product to yield in conforming to changes in its configuration due to body movements.

Referring now to the FIGS, the foam sheet 5 is faced on both sides with a knitted fabric 6,6′. A nylon fabric such as circle-knit nylon, weighing about 2.3 ounces per square yard and having an elongation along the direction of the wales or courses of between about 175 and 275 percent is preferred. Circle-knit nylon having about 37 wales per inch and about 48 courses per inch has been found particularly successful in developing the desired properties when integrally bonded onto and covering substantially the entire surface of either side of the foam member. This bonding has been found best obtained by vulcanization techniques known in the art, however, adhesive bonding can be employed. It is of importance that the fabric be substantially tensioned at the time it is bonded to the foam so as to enhance the *rate* of increase of its modulus of elasticity upon elongation thereof. The degree of tension should be less than that which will stretch the fabric beyond it elastic limit but sufficiently great as will result in a precipitous rise in it modulus of elasticity with only slight elongation. Performance of the product as respects it cooperative elongation and elasticity is most satisfactorily obtained when only the knit loops 7 on one side of the fabric are held in contact with the elastomer foam, leaving the bulk of the fabric free to exert its omnidirectional elongation. The fabric-lined elastomer product indicated generally at 8 of the invention displays a precipitous rise in it modulus of elasticity from a modulus of about 38.9 at 100 percent elongation to about 298.7 at 200 percent elongation. It exhibits elongations of typically 175 percent and tear strengths (ASTM Die C) of about 45 p.l.i.

The fabric-lined foam sheet 5 is dimensioned as desired to conform snugly to the contour of the body part, such as a leg 9, intended to be circumscribed by the product and the sheet edges 10, 10′ joined as by cementing the butt joint 11, covering the seam with nylon tape 12 and stitching the same in position. As desired, the tape may be bar tacked 13, 13′ at either of its ends. This product is odorless, inert to body fluids particularly perspiration, and has been found to be washable in common detergents, hence reusable indefinitely. The nylon linings afford slick surfaces which enhance movement of the product onto and off of the afflicted body portions and also permit ready movement of clothing over the product after it is in position on the body.

Additionally, it has been found that the integral bonding of the nylon to the foam provides a plurality of points of support to the foam and greatly enhances the retention of the integrity of the foam, even in the course of severe and repeated use. It has also been found that the integrally bonded foam and fabric structure of the invention displays increased retentiveness of its elasticity, contrary to the flimsiness which prior art products develop after only limited use.

Because the product only snugly fits the afflicted body portion, there is no deleterious reduction of blood circulation and the therapeutic aid can be worn continuously for as long as necessary to effect healing. Afflicted muscles, when relaxed, are not particularly needful of support in order to speed healing and the present invention provides no appreciable muscle support when merely snugly fitted in position. However, flexing of circumscribed muscles stretches the product causing a precipitous increase in the tendency of the product to resist elongation, thereby causing the product to momentarily become tight against the muscles and provide substantial support thereto. As the muscles again relax, the product relaxes into its original snug relationship with the muscles. As may be visualized, this property of the product is particularly useful when the wearer is an active person, for example as athelete.

In addition to the muscle support derived, the momentary tightening precludes slippage of the therapeutic aid from its circumscribing relation with the afflicted area, Moreover, the present product exhibits no tendency to creep or permanently tighten with body movements as is true of prior art products.

What is claimed is:

1. A therapeutic aid for assisting in the healing of afflicted body areas through the provision of muscle support and through retention of body heat and moisture in the immediate afflicted area to gain the therapeutic benefits thereof and comprising a closed cell, resilient, foamed elastomer sheath dimensioned to be received snugly in circumscribing relationship about said afflicted body area and forming an effective thermal and moisture barrier between said afflicted body area and ambient atmosphere, said elastomer member being not more than about one-quarter inch thick, and inner and outer elastic isotonic surface coverings integrally bonded to and covering substantially the entire inner and outer surfaces of said sheath, wherein said surface coverings are under substantial tension with respect to said sheath and provide resistance to stretch of said sheath upon the flexing of one or more of the muscles within the afflicted area circumscribed by said sheath.

2. The invention of claim 1 wherein said isotonic surface coverings comprise circle-knit nylon fabric.

3. The invention of claim 2 wherein said circle-knit nylon fabric possesses about 37 wales per inch and about 48 courses per inch.

4. The invention of claim 3 wherein said circle-knit nylon fabric possesses an elongation of between about 175 and 275 percent in the direction of either the wales or courses thereof.

5. The invention of claim 1 wherein the product possesses a $k$ factor of about 0.5.

6. The invention of claim 1 wherein the product possesses a modulus of elasticity of about 38 at 100 percent elongation and about 300 at 200 percent elongation.

7. The invention of claim 1 wherein the product possesses a tear strength of about 45 p.l.i.